(12) United States Patent
Rousseau

(10) Patent No.: US 7,204,200 B2
(45) Date of Patent: Apr. 17, 2007

(54) UTILITY CAR FOR MAINTENANCE OF LIVESTOCK

(75) Inventor: Victor Rousseau, Sainte-Monique (CA)

(73) Assignee: Rovibec Inc., St-Joseph, Sainte-Monique, Quebec (CA)

(*) Notice: Subject to any disclaimer, the term of this patent is extended or adjusted under 35 U.S.C. 154(b) by 195 days.

(21) Appl. No.: 11/006,683

(22) Filed: Dec. 8, 2004

(65) Prior Publication Data
US 2006/0118054 A1 Jun. 8, 2006

(51) Int. Cl.
*A01K 5/02* (2006.01)
*A01K 39/014* (2006.01)

(52) U.S. Cl. .............................. 119/51.01; 119/57.92; 119/57.91

(58) Field of Classification Search .................. 119/53, 119/57.1, 400, 408, 409, 449, 51.01, 58, 57.2, 119/57.7, 57.92, 436, 450, 451, 447, 525, 119/650, 651, 712, 57.3, 61.2; 414/721, 414/725, 726
See application file for complete search history.

(56) References Cited

U.S. PATENT DOCUMENTS 3,079,021 A * 2/1963 Kohorst et al. ............. 414/725
3,565,044 A   2/1971 Sorrels
4,312,297 A   1/1982 Roberts

FOREIGN PATENT DOCUMENTS

| DE | 2835112 A   | * | 3/1979  |
| DE | 3540862 A   | * | 5/1987  |
| DE | 20019224 U1 | * | 3/2002  |
| DE | 20206623 U1 | * | 8/2002  |
| EP | 1064840 A1  | * | 1/2001  |
| FR | 2531602 A   | * | 2/1984  |
| WO | WO 9424851 A1 | * | 11/1994 |

* cited by examiner

*Primary Examiner*—Son T. Nguyen
(74) *Attorney, Agent, or Firm*—Ogilvy Renault LLP

(57) ABSTRACT

A utility car for maintenance of a livestock environment is comprised of a container compartment which is supported on wheels and displaceable over a floor surface by a motor drive operated by a conductor person. A front-end loading bucket is provided for loading feed/hay into the container compartment. The container compartment has a discharge trough and a conveyor feeds the feed/hay from the compartment into the discharge trough. The front end loading bucket has a pivotal rear gate in an upper end section of a rear wall thereof for guidingly discharging feed/hay from the loading bucket into an open top end of the front wall of the container compartment and closes the open top end when the loading bucket is at a discharge position.

29 Claims, 8 Drawing Sheets

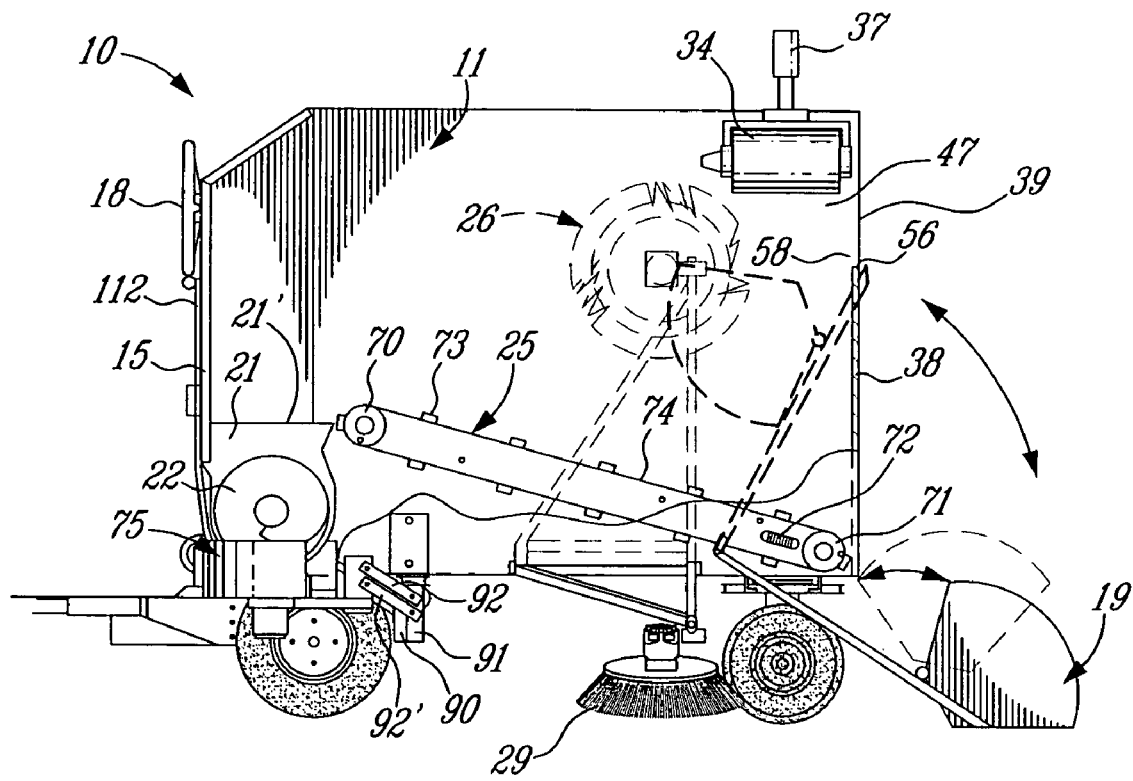
FIG_3
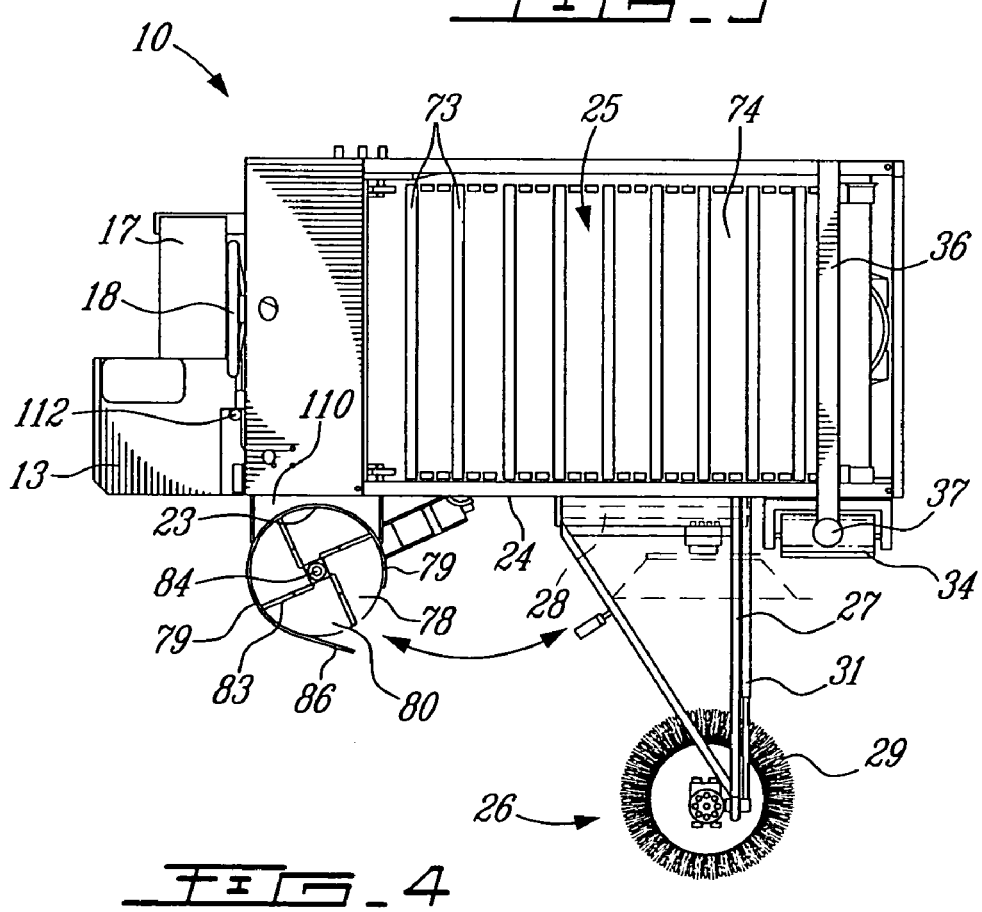
FIG_4

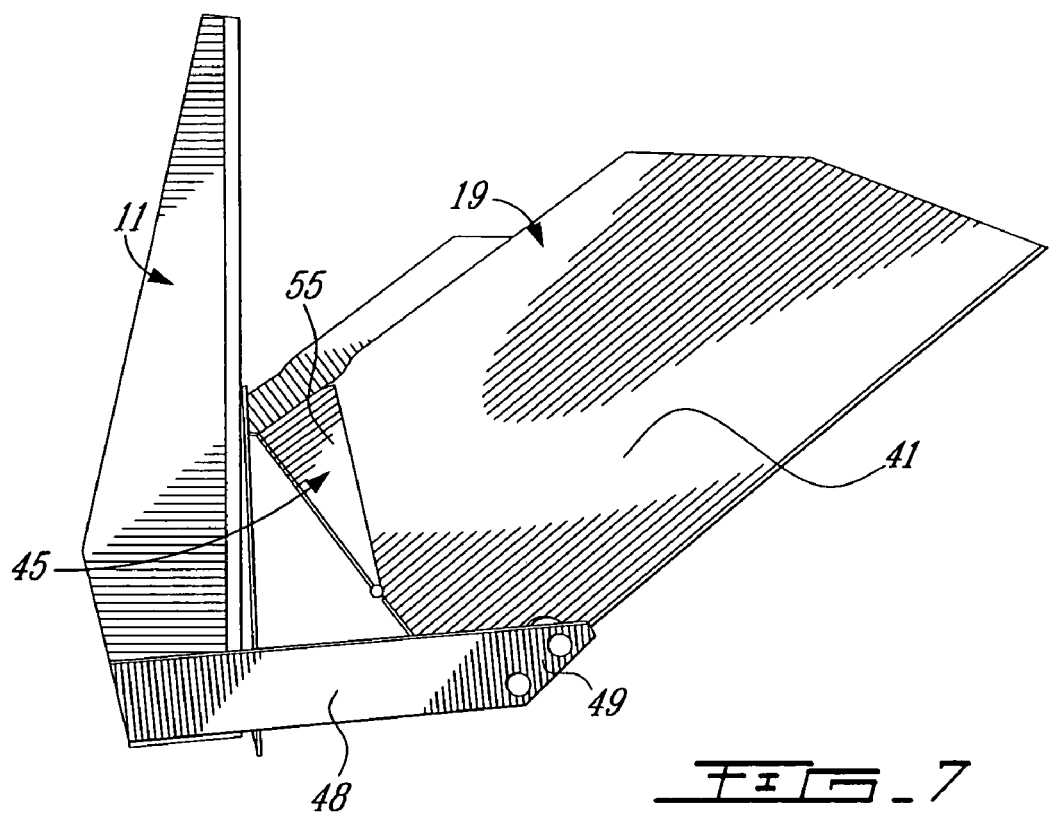
FIG_7
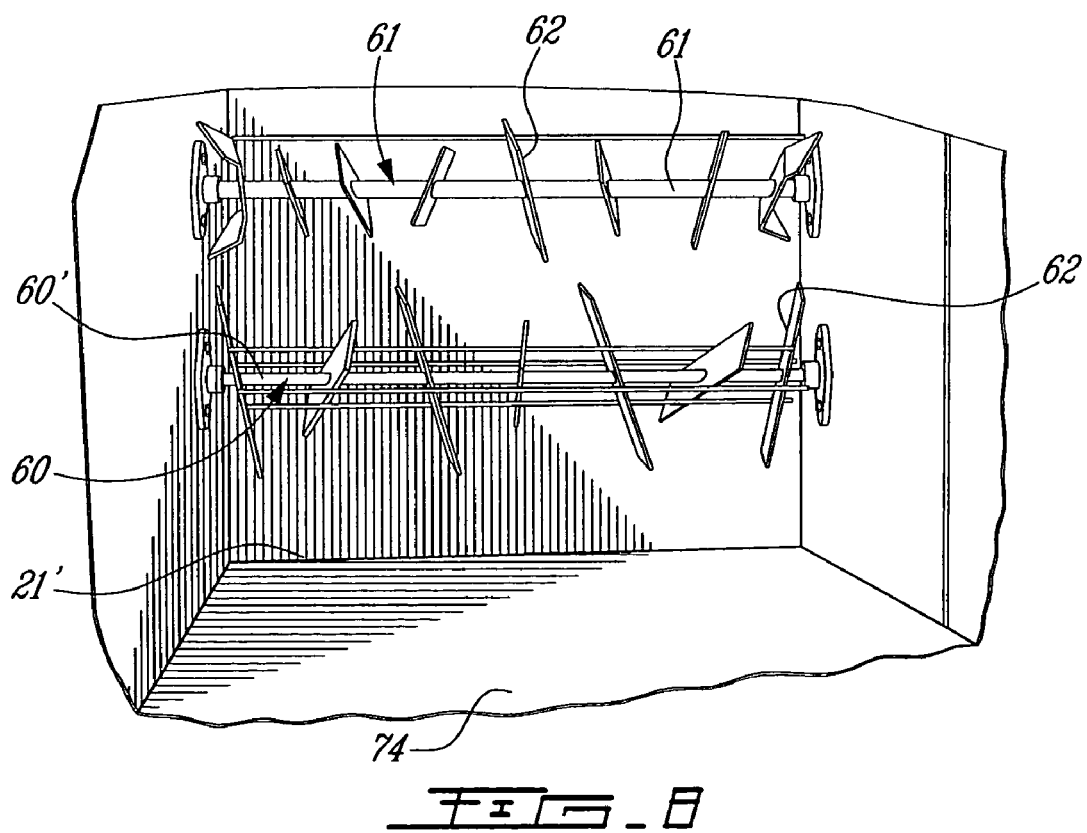
FIG_8

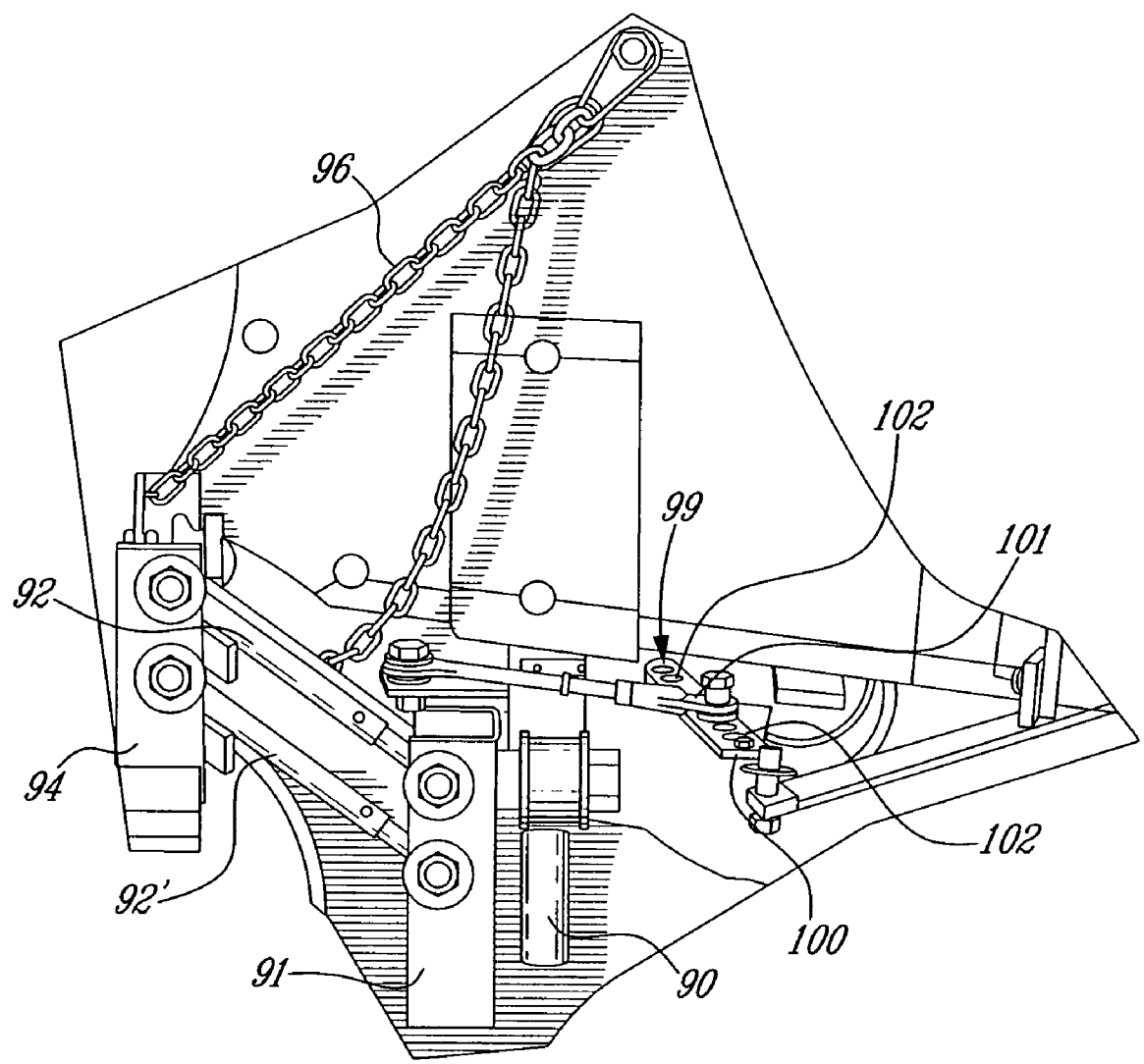
FIG_13

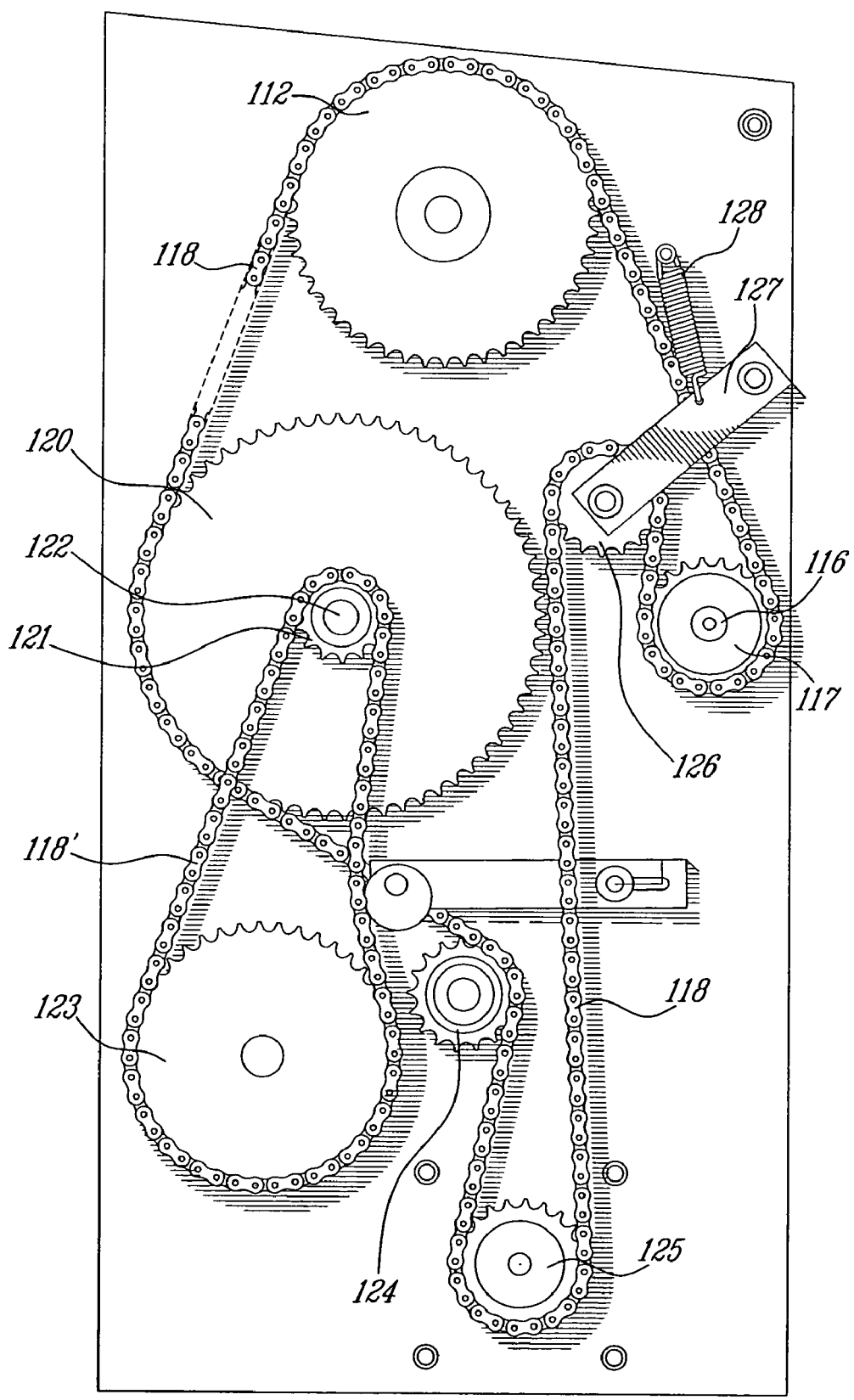
FIG_14

UTILITY CAR FOR MAINTENANCE OF LIVESTOCK

TECHNICAL FIELD

The present invention relates to a utility car for the maintenance of livestock environment and more particularly to a utility car which is capable of housing a large quantity of feed/hay material and dispensing same automatically, in a directional manner, to specific locations and which is further provided with the capability of cleaning predetermined floor areas and assuring the well-being of the livestock.

BACKGROUND ART

Various mobile devices are known whereby to deliver feed to animals in a controlled manner. For example, such feeding devices are described in U.S. Pat. Nos. 4,312,297 and 3,565,044 as examples only thereof. There is also known on the marketplace a device which resembles a snow blower of the type and which is displaceable on a surface by a person pushing the device and wherein such device is equipped with a front rotating brush to clean a surface area and direct livestock excrements mixed with hay into a scraper device which is advanced against the floor surface with the displacement of the machine. The machine is self-powered by a gas-engine and has drive wheels similar to a conventional snow blower. Other machines are known which direct a jet of water against a floor area by directional jets while at the same time a rotational brush scrapes the material to be discarded forwardly of the vehicle.

Most of these devices do not provide multifunctions and it is therefore necessary to have several machines in a livestock building to effectuate these tasks. These machines occupy large spaces and they require more maintenance. They are also time-consuming for the operators which are often in contact with unsanitary materials. Therefore, for the maintenance of large livestock enclosures, sufficient personnel is required to maintain the enclosure and the livestock in a sanitary condition. There is therefore a need to provide a machine which may be operated by a single operator and which is capable of performing multifunctions simultaneously to clean the area around the livestock as well as assuring the well-being of the livestock both from a sanitary point of view and ensuring adequate feedstock and bedding material. The discharge trough has a discharge opening on a side of the container compartment. A material directional ejector is displaceably secured to the dispensing car and displaceable from a storage position to an ejecting position at the discharge opening. The ejector is defined by an elector housing having a bottom wall and a curved directional side wall having an elector opening therein and a passage in communication with the discharge opening. A rotating propeller is provided with blades secured to a central driven shaft in a spaced-apart configuration with the blades closely spaced above the bottom wall whereby to displace feed/hay material at high speed from the discharge opening to the elector opening. The curved directional side wall has an outwardly directing section extending in a tangential direction beyond the housing bottom wall adjacent the elector opening to produce a guided material ejection flow.

According to a further broad aspect of the present invention the utility car is provided with a cleaning brush secured to a displaceable frame hingedly connected to a side wall of the container compartment and spaced from a discharge opening of the discharge trough. The cleaning brush is displaced by a piston from a storage position where the displaceable frame and brush are retacted against the side wall of the container compartment to a working position where the brush is positioned a predetermined distance from the dispensing car on a surface to be cleaned. Drive means impart rotation to the brush to clean and eject material from the surface to be cleaned towards the dispensing car.

According to a still further broad aspect of the present invention there is provided a utility car and wherein the ejector is secured to a displacing linkage comprised of a pivot post having an attachment bracket rotatably secured thereto. A pair of link arms are pivotally secured at one end to the ejector and at an opposed end to the attachment bracket. A swivel arm, of predetermined length, is secured at one end to a side wall of the container compartment spaced from the discharge opening and at an opposed end to the ejector. An actuating linkage is provided for displacing the ejector from the storage position to the ejecting position. The swivel arm and the pair of link arms cause the container compartment to move to an elevated plane under the discharge opening when displaced thereto by the actuating linkage.

According to a still further broad aspect of the present invention, there is provided a utility car and wherein a back brush is telescopically supported on the container compartment for displacement adjacent a side wall of the compartment. Position adjustment means is provided to adjust the position of a rotatable brush whereby to position the brush against an upper section of the back of a restrained animal to brush the upper section thereof along an axis of displacement of the brush.

SUMMARY OF INVENTION

It is therefore a feature of the present invention to provide a utility car for the maintenance of livestock environment and which substantially provides the desired need of the prior art.

Another feature of the present invention is to provide a utility car for maintenance of livestock environment and which is capable of storing and dispensing a large quantity of feed/hay material in a directional manner to the proper areas occupied by the livestock.

Another feature of the resent invention is to provide a utility car for maintenance of livestock and which is provided with a cleaning means for cleaning predetermined areas around the livestock and dispensing fresh bedding and/or feed material in those predetermined areas.

Another feature of the present invention is to provide a utility car for the maintenance of livestock and which is automatically loaded by a loading bucket operated by the operator of the car.

Another feature of the present invention is to provide a utility car for the maintenance of livestock and which is provided with brushes capable of brushing certain areas of livestock which is not accessible by the livestock.

According to the above features, from a broad aspect, the present invention provides a utility car for maintenance of a livestock environment. The utility car comprises a container compartment supported on wheels. A motor drive is provided for displacing the car. A control station is provided for controlling the operation of the car by an operator person. A front-end loading bucket is provided for loading feed/hay into the container compartment. The container compartment has a discharge trough with discharge means. Conveying means is provided for feeding feed/hay from the container compartment into the discharge trough. The front end loading bucket has a pivotal rear gate in an upper end section of a rear wall of the loading bucket for guidingly discharging feed/hay from the loading bucket into an open top end of the container compartment from an open top section of a front wall of the container compartment and closing the open top section when the loading bucket is at a discharge position.

BRIEF DESCRIPTION OF DRAWINGS

A preferred embodiment of the present invention will now be described with reference to the accompanying drawings in which:

FIG. 3 is a side view of the utility car with a side wall thereof partly removed to show certain features of the utility car;

FIG. 4 is a top view of the utility car showing certain working implements in working positions;

FIG. 7 is a side view showing the loading bucket at an intermediate position between a loading position and a discharge position;

FIG. 8 is a front view showing the threshing rotors supported above the discharge trough adjacent the rear wall of the container compartment;

FIG. 13 is a further view of the actuating linkage but with the directional ejector at the ejecting position; and FIG. 14 is a side view of the chain gear drive.

DESCRIPTION OF PREFERRED EMBODIMENTS

Figure 1:
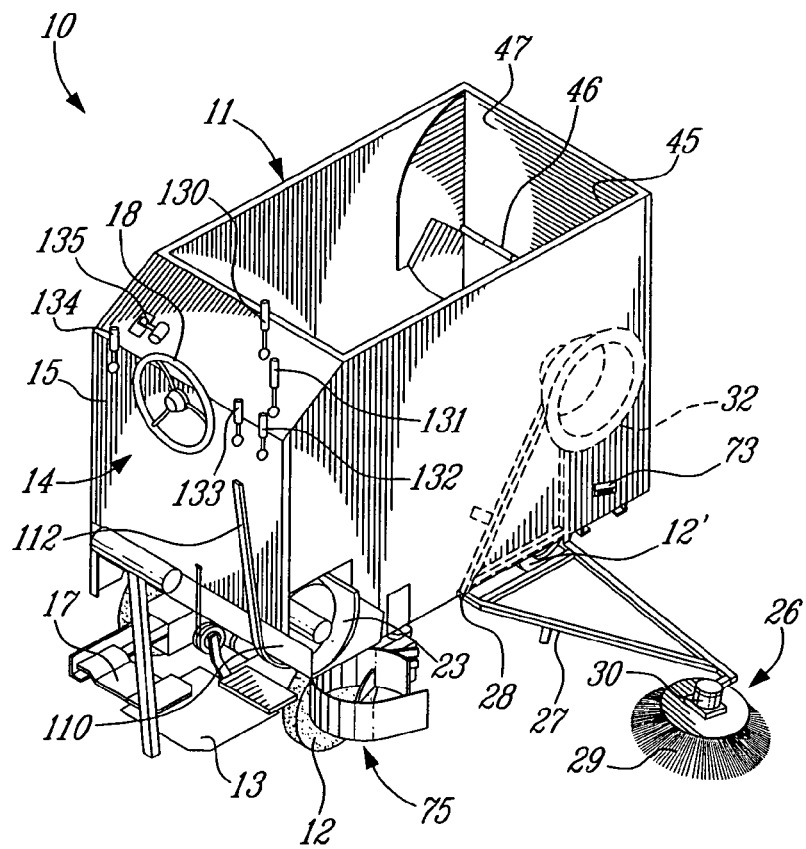
FIG. 1 is a simplified perspective rear view of the utility car of the present invention with certain elements having been removed therefrom for simplicity of illustration.

Referring now to the drawings and more particularly to FIGS. 1 to 4, there is shown generally at 10 the utility car of the present invention for the maintenance of a livestock environment. The utility car comprises a container compartment 11 supported on wheels 12, with the front wheels 12' being directional wheels controlled by an operator person standing on a support platform 13 at a control station 14 adjacent the rear wall 15 of the container compartment 11 whereby to maneuver the car on a support surface such as that found in livestock building. These buildings are constructed with concrete floor surfaces disposed behind the stalls of livestock whereby to provide access to the stalls behind the livestock. A gas-motor 16 (see FIG. 10) is mounted on a support platform 17 and is utilized to drive the hydraulics and the hydro-static transmission of the car. The front wheels 12' of the vehicle are connected by cables 9 to the steering wheel 18 secured to the rear wall 15.

As shown in FIG. 3, a front-end loading bucket 19 is secured to the front end of the container compartment 11 and is provided for loading feed/hay 20 or any other desirable material into the container compartment 11. A discharge trough 21 is located at the rear end inside the container compartment adjacent the rear wall 15 and extends transversely thereof. The trough 21 is provided with an auger screw discharger 22 for transporting the feed/hay material 20 to a discharge opening 23 located in the side wall 24 of the container compartment 11 and adjacent a bottom area thereof. Conveying means in the form of a belt conveyor 25 conveys the feed/hay material which is loaded in the container 11 into the discharge trough 21 and into thresher rotors as will be described later.

As shown in these Figures, a cleaning brush assembly 26 is secured to a displaceable frame 27 which is hingedly connected by hinges 28 to the side wall 24 of the container compartment 11 and spaced from the discharge opening 23. A circular brush 29 is supported by the displaceable frame 27 and has a motor 30 to impart rotational drive thereto.

Figure 9:
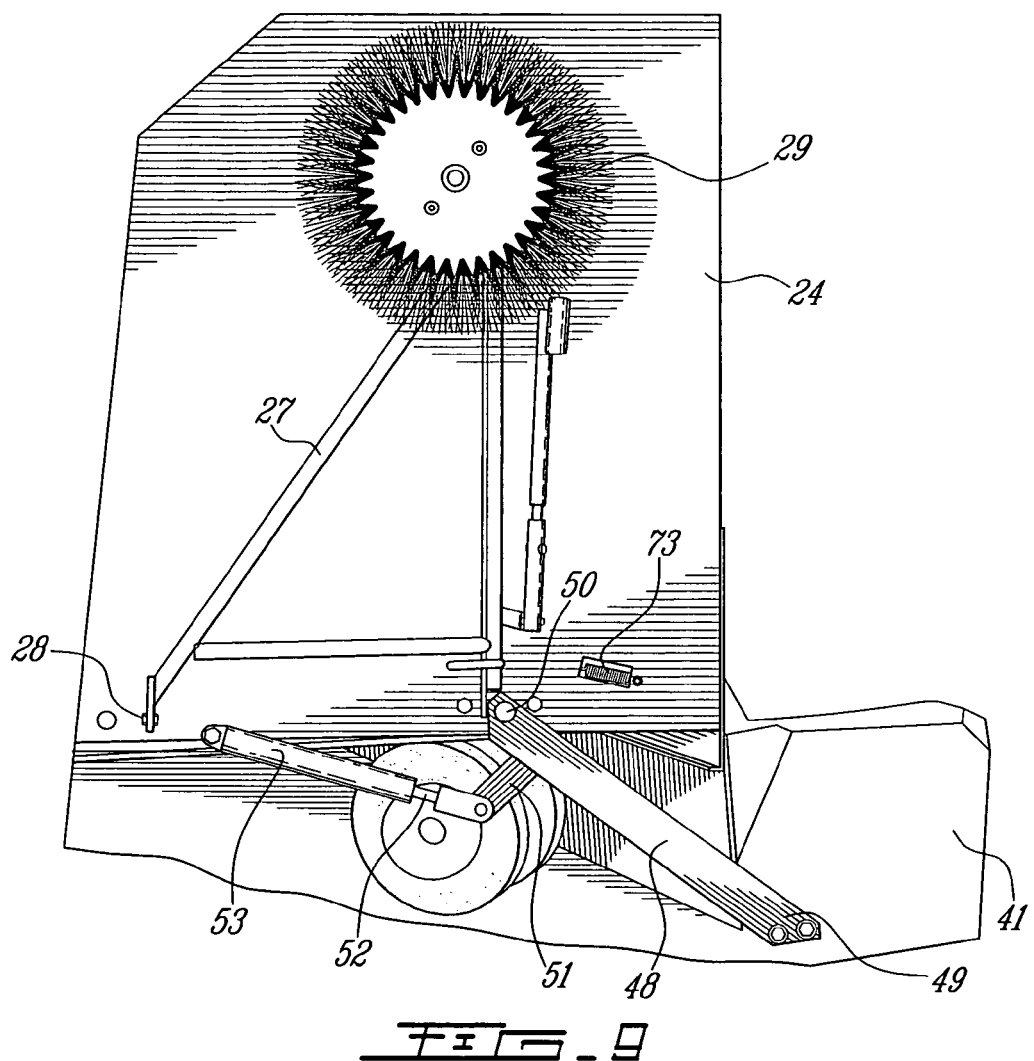
FIG. 9 is a side view illustrating the construction of a displaceable cleaning brush and its support mechanism.

As shown in FIG. 9, the cleaning brush assembly 26 is displaceable by an actuating piston 31 from a storage position 32 where the displaceable frame 27 and the brush 29 are retracted against the side wall 24 of the container compartment, to a working position as illustrated in FIG. 1. At the working position, the brush is disposed a predetermined distance from the dispensing car on a surface to be cleaned. When the motor 30 is actuated, the brush turns in a predetermined direction to eject material from the surface being cleaned towards the dispensing car.

Figure 2:
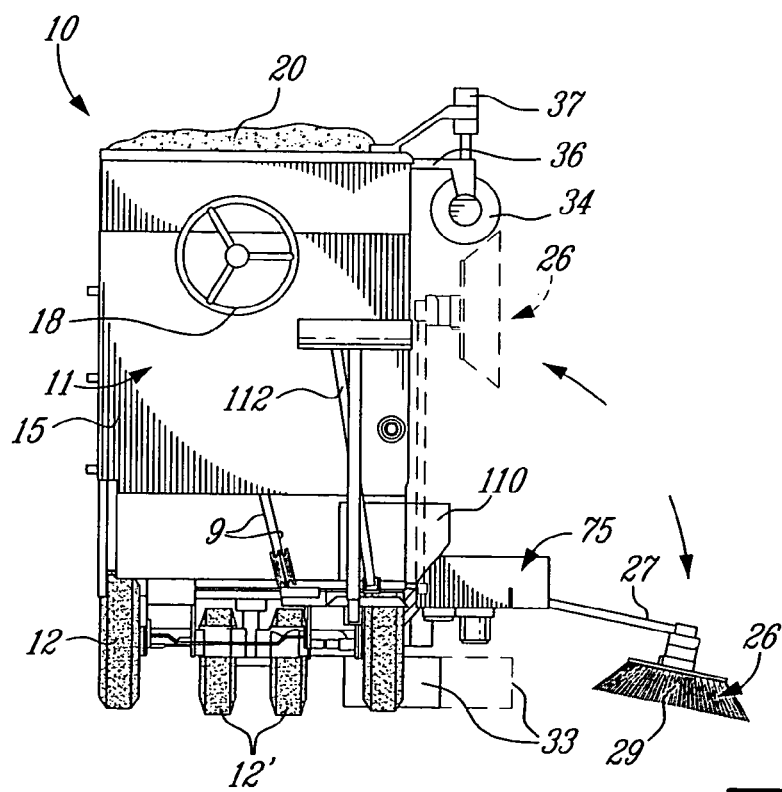
FIG. 2 is a rear view of the utility car showing additional working implements.

As shown in FIG. 2, the dispensing car is further provided with a scraper blade 33 which is secured under the container compartment 11 and positionable for displacing the ejected material by the brush in the direction of movement of the car. This scraper blade may have a variety of shapes to suit its application and its position is controlled by suitable linkages and piston actuable by the operator at the control station 14.

As also shown in FIGS. 2 and 3, a livestock back brush 34 is also be telescopically supported by a telescoping mechanism 35 secured to the top end of the container compartment whereby the back brush 34 can be extended outwardly of the side wall 24 of the container compartment 11 to be positioned over animals which are restrained in stalls, such as cows. A telescopic arm 36 is displaceable by suitable displacement means controlled by an operator until the brush lies above the back of a cow and the brush is then lowered by an actuable piston 37 whereby the brush touches the upper section of the back of a restrained cow whereby to brush this section which is not accessible to the cow by swaying its tail against itself and the brush is then moved by the telescopic connection 35 whereby to travel along this upper section thereof. This type of brushing provides a feeling of wellness to the animal and maintain its fur and hyde sanitary.

Figure 5:
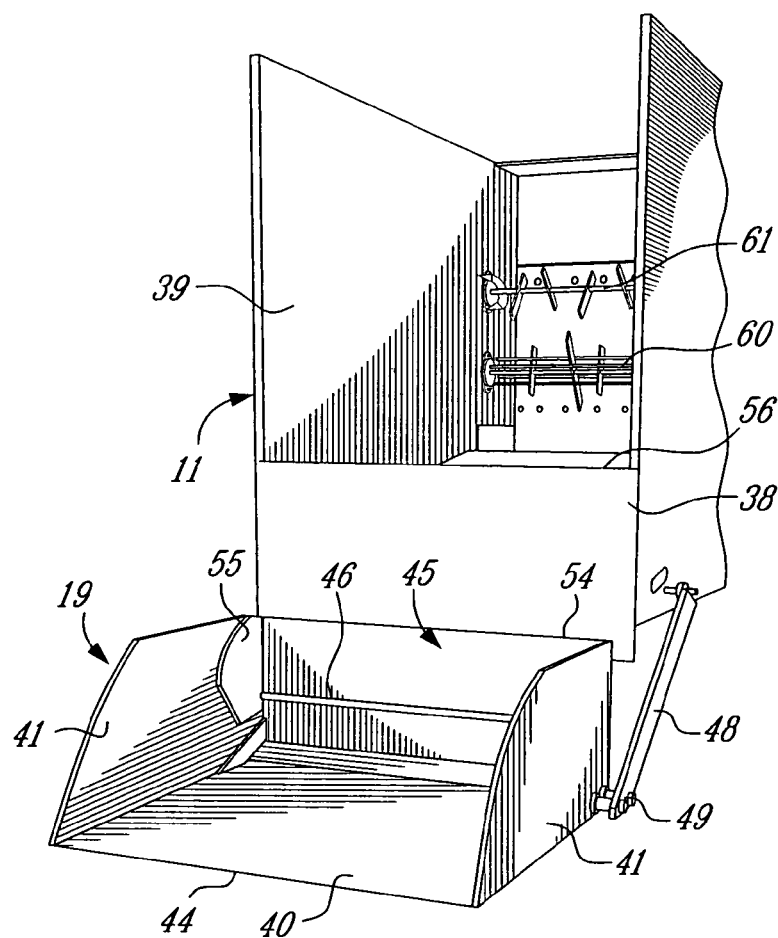
FIG. 5 is a perspective front view showing the front end of the container compartment and the loading bucket.
Figure 6:
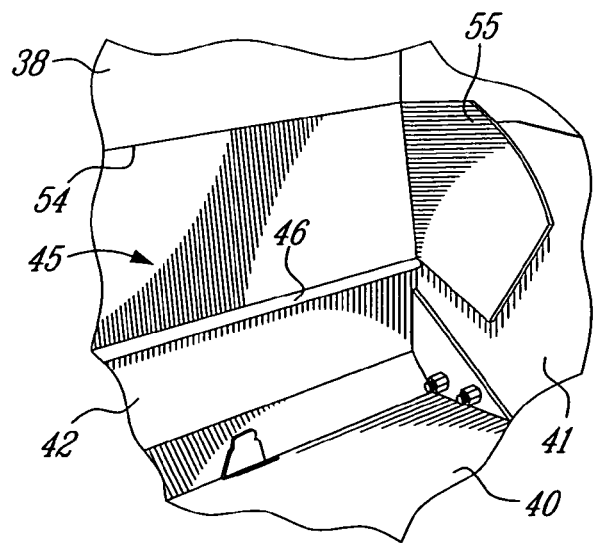
FIG. 6 is a fragmented perspective view of a rear section of the loading bucket.

With reference now to FIGS. 5, 6 and 7, there will be described in more detail the construction and operation of the front end loading bucket 19. As shown in FIG. 5, the loading bucket 19 has a bottom wall 40, opposed side walls 41 and a rear wall 42. The bucket also has an open front end 43 provided with a scraping edge 44 forwardly of the bottom wall 40. A pivotal rear gate 45 is provided in an upper end section of the rear wall 42 and connected thereto by a piano hinge 46. This pivotal rear gate 45 guidingly discharges the feed/hay material from the loading bucket into an open top end 47 of the container compartment as illustrated in FIGS. 1 and 3. As can be seen from FIG. 3, the front wall 38 of the container compartment 11 has an open top section 39 whereby to permit passage of the bucket 19 for discharging feed/hay material therefrom and into the container compartment.

As shown in FIG. 9, the loading bucket 19 is displaceable by a pair of pivotal support arms 48 each immovably secured to the bucket at its forward end 49 by attachment to the rear corner portion of the side walls 41 of the bucket. Each pivotal support arm 48 is also pivotally connected on a pivot 50 to a respective one of opposed side walls 24 of the container compartment. The pivotal support arms 48 are each provided with a connecting arm 51 to which is secured a piston rod end 52 of the piston 53 which constitutes a means to displace the loading bucket on an arc, as illustrated by arrows 53 in FIG. 3, to displace the bucket from a pick-up position, as shown in FIG. 3 where the bucket is loaded, to a discharge position as shown in FIGS. 1 and 4.

As shown in FIGS. 5 to 7, the pivotal rear gate 45 has a straight horizontal top edge 54 and opposed side wings 55 which projects inside the opposed side walls 41 of the bucket and closely spaced therewith. The pivotal rear gate tilts outwardly of the rear wall 42 of the bucket when loaded with material whereby to contain the material in the bucket when the bucket is displaced from the pick-up position to the discharge position. This is done by the hinge connection and the material pushing the pivotal rear gate against the front wall 38 of the container compartment sliding thereon to seal the bucket rear end and then tilting over the top edge 56 of the front wall 38 as the bucket moves into the open top section 39. As the bucket enters into the open top section 39, the pivotal rear gate starts hinging inwardly downwards to substantially seal the open top end 39 of the front wall of the container compartment together with the bucket when at the discharge position. This is illustrated in FIG. 1 where it can be seen that the pivotal rear gate 45 is hinged totally downwards from its piano hinge connection 46 and obstructs the gap 58 (see FIG. 3) which is formed between the bucket rear wall 42 and the top edge 56 of the front wall 38. Because of this pivotal rear gate it is not necessary to construct articulated support arms 48 for the bucket to prevent material from falling out of the bucket during its loading cycle. Also, with this pivotal rear gate, the space between the top edge of the front wall of the container and the lower edge of the rear wall of the bucket is automatically closed when the bucket is at its loading position.

As shown in FIGS. 5 and 8, there is further provided inside the container compartment 11 a pair of threshing rotors 60 and 61 supported above the top open end 21' of the discharge trough 21 for loosening compacted feed/hay material 20 displaced thereagainst by the belt conveyor 25 or by the load of material contained within the container compartment. As shown in FIG. 2, the feed/hay material 20 can be loaded to exceed the top end of the container and accordingly it loads up against the threshing rotors 60. When these threshing rotors are actuated they loosen the compacted feed/hay material and discharge it into the top end of the discharge trough 21. These threshing rotors are supported spaced one above the other and are each provided with an elongated driven shaft 60' and 61', respectively, to which are secured a plurality of threshing blades 62 disposed in a spaced-apart relationship along the driven shafts. The threshing rotors are also closely spaced to the rear wall 15 of the container compartment.

Referring again to FIGS. 3 and 4, it can be seen that the conveyor belt 25 forms a bottom wall of the container compartment as it extends substantially entirely thereacross. The conveyor belt is a flat fabric belt trained about a pair of drive sprockets or rollers 70 and 71 with roller 71 being spring-biased by an adjustable spring 72 accessible through an aperture 73 provided in opposed side walls 24 of the container compartment, as shown in FIG. 1, to adjust the tension on the belt conveyor. The conveyor belt is inclined upwards from a lower front end to a position above the discharge trough top opening 21' as shown in FIG. 3. A plurality of spaced conveying bars 73 are secured to the flat fabric belt 74.

Figure 10:
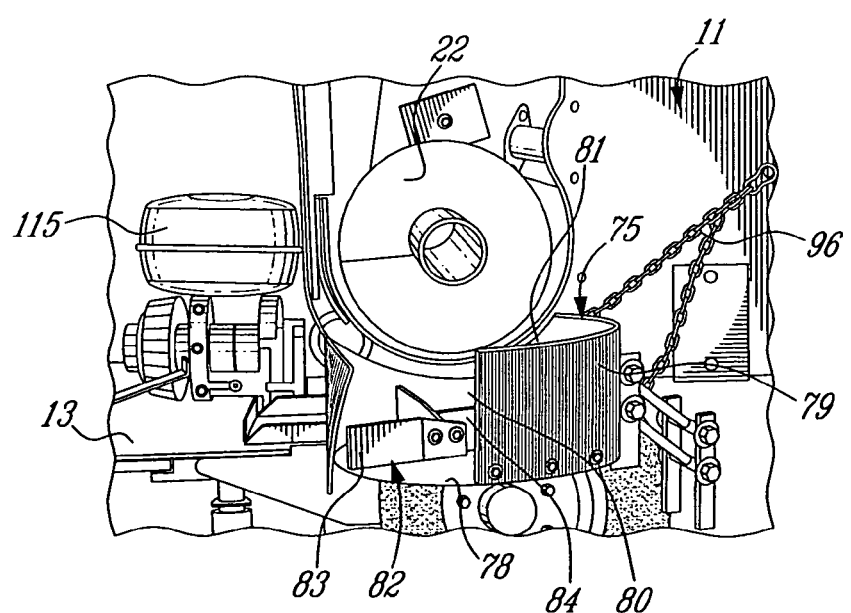
FIG. 10 is a perspective end view of the discharge trough and the directional ejector associated therewith at an ejecting position.
Figure 11:
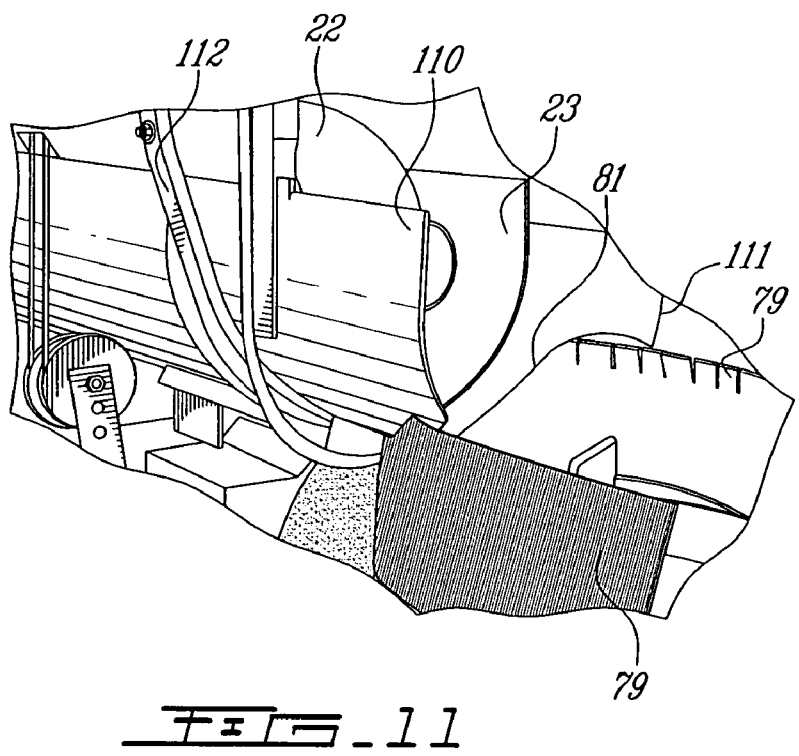
FIG. 11 is a fragmented perspective view showing the trough extension shroud at the discharge opening of the discharge trough.
Figure 12:
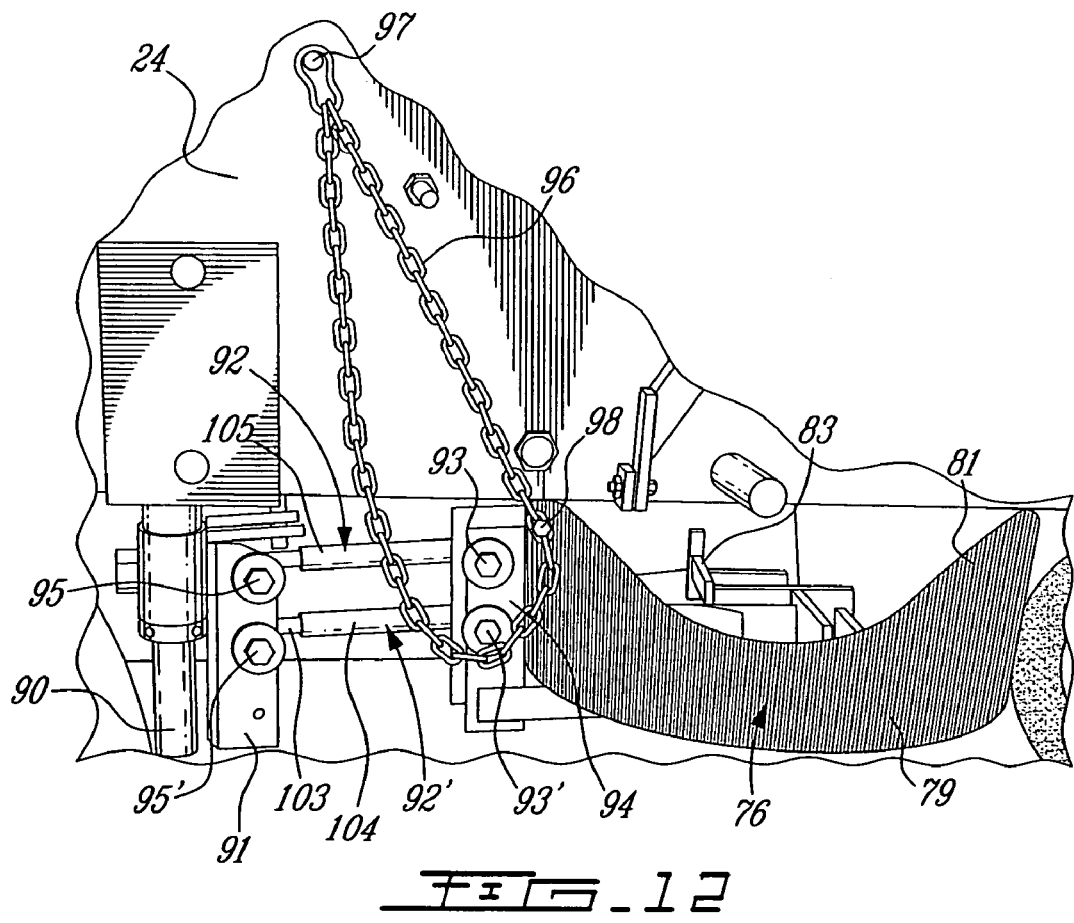
FIG. 12 is a perspective view illustrating the actuating linkage of the directional ejector with the ejector being at a storage position under the container compartment.

Referring now to FIGS. 10 to 12, there is shown the construction of a material directional ejector 75 which is displaceably secured to the dispensing car 10 and displaceable from a storage position 76, as shown in FIG. 12, to an ejecting position 77 at the discharge opening 23 of the discharge trough, as shown in FIG. 10.

As more clearly illustrated in FIG. 10, the directional ejector 75 is an ejector housing having a bottom wall 78 and a curved directional side wall 79 provided with an ejector opening 80. The curved directional side wall 79 has a curved passage opening 81 for close fit with the discharge opening of the discharge trough 21. A rotating propeller 82 is provided with blades 83 secured to a central driven shaft 84 which is driven by a motor 85 secured under the bottom wall 78 whereby to impart rotation to the propeller 82. As more clearly illustrated in FIG. 10, the directional ejector 75 is positioned in close relationship to the discharge opening 23 whereby the propeller receives material discharged by the auger screw 22 directly thereover to eject this material at high speed through the ejector opening 80. As more clearly illustrated in FIG. 4, the curved directional side wall 79 has an outwardly directing section 86 which extends in a tangential direction beyond the housing bottom wall 78 adjacent the ejector opening 80 to produce a guided material ejection flow. By controlling the speed of the motor 85 one can control the distance that the material is ejected.

Referring now to FIGS. 12 and 13, there will be described the displacing linkage for displacing the ejector housing from its storage position 76 under a bottom wall of the container compartment to its ejecting position 77 adjacent the discharge opening 23 of the discharge trough 21. As hereinshown, the displacing linkage comprises a pivot post 90 having an attachment bracket 91 rotatably secured thereto. A pair of link arms 92 and 92' are pivotally secured at one end 93 and 93' to an ejector housing bracket 94 and at opposed ends 95 and 95' to the attachment bracket 91. A swivel arm 96 of predetermined length is secured at one end 97 to the side wall 24 of the container compartment and spaced from the discharge opening 23. The opposed end of the swivel arm 96 is secured to a connector 98 secured to the housing bracket 94. This swivel arm has a predetermined length whereby to move the directional ejector 75 from its storage position and upwardly to its ejecting position. This upward movement is approximately 4" in height.

An actuating linkage 99 is provided for displacing the ejector housing 75 from the storage position to the ejecting position. The swivel arm 96 and the pair of link arms 92 and 92' guide the container compartment to move to an elevated plane due to their pivotal and swivel action. The actuating linkage 99 is secured to the attachment bracket 91 which is displaceable about the pivot post 90. The actuating linkage 99 has a multi-position engagement arm 100 to which a pivotal connector rod 101 is securable and at selected ones of positions as provided by a plurality of holes 102 provided in the engagement arm 100. The other end of the pivotal connector rod 101 is secured to the attachment bracket 91. This multi-position engagement arm provides for the adjustment of the position of the ejector housing relative to the discharge opening of the discharge trough.

As can be seen from FIG. 12, the pair of link arms 92 comprises an inner rod 103 and an outer tubular rod 104. The inner rod 103 is disposed in close axial rotational fit within the tubular rod 104. A set screw 105 interconnects the tubular rod to the inner rod. The axial position of these rods relative to one another adjusts the angle of inclination of the ejector housing relative to the horizontal whereby to tilt up or down or be adjusted horizontal.

As shown in FIGS. 1 and 11, a trough extension shroud 110 is axially displaceable adjacent the discharge opening 23 and has a free end 111 which is shaped for close fit with the passage of the side wall of the ejector housing. A link control leaver 112 (see FIG. 1) is actuable by an operator person from the control station whereby to extend or retract the extension shroud from adjacent the discharge opening 23. This is also desirable if the directional ejector 75 is not utilized where the feed/hay is discharged by gravity from the discharge opening 23 which can now be extended to the end of the extendable shroud.

As shown in FIG. 1, the control station 14 is provided with various controls for operating the various accessories, motors, mechanism, etc., of the dispensing car. The gas-motor 115 as shown in FIG. 10 is located on the motor support platform 17 and drives the hydraulics and hydrostatic transmission of the working and displaceable parts. The motor also drives a drive shaft 116 of a drive sprocket 117 of a chain link gear coupling network as shown in FIG. 14.

As shown in FIG. 14, the various sprockets illustrated therein are all interconnected by a drive chain 118 and 118'. The drive sprocket 17 rotates the drive chain 118 about a drive gear 119 to operate the driven shaft 61' of the uppermost threshing rotor 61. The drive gear 120 operates the driven shaft 61' of the lower thresher rotor 60. A pinion gear 121 is coupled to the driven shaft end 122 and through a second drive chain 118' drives a drive sprocket 123 which drives the rotor conveyor roll 71. The main chain link 118 is then trained about a guide sprocket 124 and an auger discharge sprocket 125 to drive the auger screw 22. A tensioning sprocket 126 is biased against the chain 118 by a biasing arm 127 which is spring-loaded by spring 128.

The control station 14 lever 130 operates the up and down motion of the bucket. The lever 131 operates the hydraulic of the two threshers. Lever 132 operates the directional ejector 75 and lever 133 operates the brush which is a variable speed brush. The lever 134 operates the position of the bucket. The controls 135 are provided to operate the telescopic connector 35 and the piston 37 of the back brush assembly 34.

It is within the ambit of the present invention to cover any obvious modifications of the preferred embodiment described herein, provided such modifications fall within the scope of the appended claims.

I claim:

1. A utility car for maintenance of a livestock environment and comprising a container compartment supported on wheels, a motor drive for displacing said car, a control station for controlling the operation of said car, a front-end loading bucket for loading feed/hay into said container compartment, said container compartment having a discharge trough with discharge means, conveying means for feeding feed/hay from said container compartment into said discharge trough, said front end loading bucket having a pivotal rear gate in an upper end section of a rear wall of said loading bucket for guidingly discharging feed/hay from said loading bucket into an open top end of said container compartment from an open top section of a front wall of said container compartment and closing said open top section when said loading bucket is at a discharge position, said discharge trough having a discharge opening on a side of said container compartment and a material directional ejector displaceably secured to said dispensing car and displaceable from a storage position to an ejecting position at said discharge opening, said ejector being defined by an ejector housing having a bottom wall and a curved directional side wall having an ejector opening therein and a passage in communication with said discharge opening, a rotating propeller having blades secured to a central driven shaft in a spaced apart configuration with said blades closely spaced above said bottom wall whereby to displace feed/hay material at high speed from said discharge opening to said ejector opening, said curved directional side wall has an outwardly directing section extending in a tangential direction beyond said housing bottom wall adjacent said ejector opening to produce a guided material ejection flow.

2. A utility car as claimed in claim 1 wherein said loading bucket has a bottom wall, opposed side walls, a rear wall and an open front end; said bucket being displaceable by a pair of pivotal support arms each immovably secured at one end to a respective one of said opposed side walls of said bucket, each pivotal support arm being pivotally connected at an opposed end to a pivot connection on opposed sides of said dispensing car, means to displace said loading bucket on an arc from a pick-up position where said bucket is loaded to said discharge position.

3. A utility car as claimed in claim 2 wherein said pivotal rear gate is hingedly secured along a top edge of said rear wall of said loading bucket, said pivotal rear gate having a straight horizontal top edge and opposed side wings projecting inside said opposed side walls of said bucket and closely spaced therewith, said pivotal rear gate tilting outwardly of said rear wall of said bucket to contain feed/hay in said bucket from said pick-up position to said discharge position and substantially sealing said open top end of said front wall of said container compartment together with said bucket when at said discharge position.

4. A utility car as claimed in claim 3 wherein said straight horizontal top edge of said pivotal rear gate slidingly engages said front wall of said container compartment during displacement of said bucket from said pick-up position towards said discharge position and together with said opposed side wings restraining said feed/hay into said bucket.

5. A utility ear as claimed in claim 4 wherein said bucket, when at said discharge position, a lower edge of said rear wall of said bucket is spaced above a top edge of said front wall of said container compartment; said pivotal rear gate being hinged outwardly of said rear wall of said bucket to obstruct an open space between said lower edge of said rear wall of said bucket and said top edge of said front wall of said container compartment to effect said substantially sealing of said open top end of said front wall to contain a load of said feed/hay into said container compartment.

6. A utility car as claimed in claim 1 wherein there is further provided a cleaning brush secured to a displaceable frame hingedly connected to a side wall of said container compartment and spaced from a discharge opening of said discharge trough, said cleaning brush being displaced by a piston from a storage position where said displaceable frame and brush are retracted against said side wall of said container compartment to a working position where said brush is positioned a predetermined distance from said dispensing car on a surface to be cleaned, and drive means to impart rotation to said brush to clean and eject material from said surface to be cleaned towards said dispensing car.

7. A utility ear as claimed in claim 6 wherein there is further provided a scraper blade secured under said container compartment and adapted to be positioned for displacing said material ejected by said brush.

8. A utility car as claimed in claim 6 wherein there is further provided a scraper blade secured under said container compartment and adapted to be positioned for displacing said material ejected by said brush.

9. A utility car as claimed in claim 1 wherein there is further provided thresher means supported above said discharge trough for loosening compacted feed/hay conveyed to said discharge trough.

10. A utility car as claimed in claim 9 wherein said thresher means is constituted by one or more threshing rotors supported spaced above said discharge trough, said rotors each having an elongated driven shaft with a plurality of threshing blades secured in spaced-apart relationship therealong.

11. A utility car as claimed in claim 10 wherein there are two of said threshing rotors spaced one above the other and closely spaced to a rear wall of said container compartment with said discharge trough thereunder.

12. A utility car as claimed in claim 10 wherein said discharge means is an elongated auger screw rotatably driven in said discharge trough to discharge feed/hay from said container through a discharge opening in a side wall of said container compartment.

13. A utility car as claimed in claim 12 wherein said conveying means is a conveyor belt forming a bottom wall of said container compartment for displacing feed/hay towards said discharge trough.

14. A utility car as claimed in claim 13 wherein said conveyor belt is a flat fabric belt provided with spaced conveying bars secured to a top surface thereof, said conveyor belt being inclined upwards from a lower front end to a position above said discharge trough.

15. A utility car as claimed in claim 1 wherein said discharge means is an elongated auger screw rotatably supported in said discharge trough for displacing said feed/hay from said container compartment to said discharge opening to discharge same.

16. A utility car as claimed in claim 1 wherein said ejector housing is secured to a displacing linkage comprised of a pivot post having an attachment bracket rotatably secured thereto, a pair of link arms pivotally secured at one end to said ejector housing and at an opposed end to said attachment bracket, a swivel arm of predetermined length secured at one end to a side wall of said container compartment spaced from said discharge opening and at an opposed end to said ejector housing, and an actuating linkage for displacing said ejector housing from said storage position to said ejecting position, said swivel arm and said pair of link arms causing said container compartment to move to an elevated plane under said discharge opening when displaced thereto by said actuating linkage.

17. A utility car as claimed in claim 16 wherein said actuating linkage is secured to said attachment bracket displaceable about said pivot post.

18. A utility car as claimed in claim 17 wherein said actuating linkage has a multi-position engagement arm to which a pivotal connector rod is securable thereto and to said attachment bracket to adjust the position of said ejector housing relative to said discharge opening.

19. A utility car as claimed in claim 16 wherein said pair of link arms are tubular link arms comprised of an inner rod and an outer tubular rod, said inner rod being disposed in close axial rotational fit within said tubular rod, and a set-screw interconnecting said tubular rod to said inner rod, said rods adjusting the angle of inclination of said ejector housing relative to the horizontal.

20. A utility car as claimed in claim 16 wherein said pair of link arms are tubular link arms comprised of an inner rod and an outer tubular rod, said inner rod being disposed in close axial rotational fit within said tubular rod, and a set-screw interconnecting said tubular rod to said inner rod, said rods adjusting the angle of inclination of said ejector housing relative to the horizontal.

21. A utility car as claimed in claim 1 wherein there is further provided a trough extension shroud axially displaceable adjacent said discharge opening and having a free end shaped for close fit with said passage of said side wall of said ejector housing, and means to displace said trough extension shroud.

22. A utility car as claimed in claim 21 wherein said means to displace is a link control lever actionable by an operator person from said control station.

23. A utility car as claimed in claim 1 wherein there is further provided a back brush telescopically supported on said container compartment for displacement adjacent a side wall of said compartment, and position adjustment means to adjust the position of a rotatable brush whereby to position same against an upper section of the back of a restrained animal to brush said upper section thereof along an axis of displacement of said brush.

24. A utility car as claimed in claim 1 wherein said control station is provided rearwardly of said dispensing car, a support platform secured to said container compartment and projecting rearwardly thereof for supporting an operator person, a drive wheel at said control station for controlling a pair of front wheels of said dispensing car, and controls for operating working and displaceable parts of said dispensing car, said motor drive having a coupling to a drive shaft of a chain link gear coupling network to impart drives to some of said working and displaceable parts.

25. A utility car for maintenance of a livestock environment and comprising a container compartment supported on wheels, a motor drive for displacing said car, a control station for controlling the operation of said car, a front-end loading bucket for loading feed/hay into said container compartment, said container compartment having a discharge trough with discharge means, conveying means for feeding feed/hay from said container compartment into said discharge trough, said front end loading bucket having a pivotal rear gate in an upper end section of a rear wall of said loading bucket for guidingly discharging feed/hay from said loading bucket into an open top end of said container compartment from an open top section of a front wall of said container compartment and closing said open top section when said loading bucket is at a discharge position, and wherein there is further provided a cleaning brush secured to a displaceable frame hingedly connected to a side wall of said container compartment and spaced from a discharge opening of said discharge trough, said cleaning brush being displaced by a piston from a storage position where said displaceable frame and brush are refracted against said side wall of said container compartment to a working position where said brush is positioned a predetermined distance from said dispensing car on a surface to be cleaned, and drive means to impart rotation to said brush to clean and eject material from said surface to be cleaned towards said dispensing car.

26. A utility car for maintenance of a livestock environment and comprising a container compartment supported on wheels, a motor drive for displacing said car, a control station for controlling the operation of said car, a front-end loading bucket for loading feed/hay into said container compartment, said container compartment having a discharge trough with discharge means, conveying means for feeding feed/hay from said container compartment into said discharge trough, said front end loading bucket having a pivotal rear gate in an upper end section of a rear wall of said loading bucket for guidingly discharging feed/hay from said loading bucket into an open top end of said container compartment from an open top section of a front wall of said container compartment and closing said open top section when said loading bucket is at a discharge position, said discharge trough having a discharge opening on a side of said container compartment, and a material directional ejector displaceably secured to said dispensing car and displaceable from a storage position to an ejecting position at said discharge opening, said ejector being secured to a displacing linkage comprised of a pivot post having an attachment bracket rotatably secured thereto, a pair of link arms pivotally secured at one end to said ejector and at an opposed end to said attachment bracket, a swivel arm of predetermined length secured at one end to a side wall of said container compartment spaced from said discharge opening and at an opposed end to said ejector, and an actuating linkage for displacing said ejector from said storage position to said ejecting position, said swivel arm and said pair of link arms causing said container compartment to move to an elevated plane under said discharge opening when displaced thereto by said actuating linkage.

27. A utility car as claimed in claim 26 wherein said actuating linkage is secured to said attachment bracket displaceable about said pivot post.

28. A utility car as claimed in claim 26 wherein said actuating linkage has a multi-position engagement arm to which a pivotal connector rod is securable thereto and to said attachment bracket to adjust the position of said ejector housing relative to said discharge opening.

29. A utility car for maintenance of a livestock environment and comprising a container compartment supported on wheels, a motor drive for displacing said car, a control station for controlling the operation of said car, a front-end loading bucket for loading feed/hay into said container compartment, said container compartment having a discharge trough with discharge means, conveying means for feeding feed/hay from said container compartment into said discharge trough, said front end loading bucket having a pivotal rear gate in an upper end section of a rear wall of said loading bucket for guidingly discharging feed/hay from said loading bucket into an open top end of said container compartment from an open top section of a front wall of said container compartment and closing said open top section when said loading bucket is at a discharge position, and wherein there is further provided a back brush telescopically supported on said container compartment for displacement adjacent a side wall of said compartment, and position adjustment means to adjust the position of a rotatable brush whereby to position same against an upper section of the back of a restrained animal to brush said upper section thereof along an axis of displacement of said brush.

* * * * *